US010961334B2

(12) United States Patent
Liu et al.

(10) Patent No.: US 10,961,334 B2
(45) Date of Patent: Mar. 30, 2021

(54) POLYMER COMPOSITION AND A PROCESS FOR PRODUCTION OF THE POLYMER COMPOSITION

(71) Applicant: BOREALIS AG, Vienna (AT)

(72) Inventors: Yi Liu, Engerwitzdorf (AT); Victor Sumerin, Helsinki (FI); Ravindra Tupe, Porvoo (FI)

(73) Assignee: BOREALIS AG, Vienna (AT)

( * ) Notice: Subject to any disclaimer, the term of this patent is extended or adjusted under 35 U.S.C. 154(b) by 147 days.

(21) Appl. No.: 16/306,296

(22) PCT Filed: May 29, 2017

(86) PCT No.: PCT/EP2017/062902
§ 371 (c)(1),
(2) Date: Nov. 30, 2018

(87) PCT Pub. No.: WO2017/207493
PCT Pub. Date: Dec. 7, 2017

(65) Prior Publication Data
US 2019/0292283 A1    Sep. 26, 2019

(30) Foreign Application Priority Data

May 31, 2016 (EP) .................................. 16172061

(51) Int. Cl.
| | |
|---|---|
| C08F 210/16 | (2006.01) |
| C08F 4/649 | (2006.01) |
| C08F 4/655 | (2006.01) |
| C08F 4/659 | (2006.01) |
| C08L 23/08 | (2006.01) |
| C08L 23/04 | (2006.01) |

(52) U.S. Cl.
CPC .......... C08F 210/16 (2013.01); C08F 4/6494 (2013.01); C08F 4/6555 (2013.01); C08F 4/65916 (2013.01); C08L 23/0807 (2013.01); C08L 23/0815 (2013.01); C08F 2500/12 (2013.01); C08L 2203/18 (2013.01); C08L 2205/025 (2013.01); C08L 2308/00 (2013.01)

(58) Field of Classification Search
USPC ................................................ 526/65, 124.8
See application file for complete search history.

(56) References Cited

U.S. PATENT DOCUMENTS

| | | |
|---|---|---|
| 3,242,150 A | 3/1966 | Scoggin |
| 3,324,093 A | 6/1967 | Alleman |
| 3,374,211 A | 3/1968 | Marwil et al. |
| 3,405,109 A | 10/1968 | Rohlfing |
| 4,532,311 A | 7/1985 | Fulks et al. |
| 4,543,399 A | 9/1985 | Jenkins, III et al. |
| 4,578,879 A | 4/1986 | Yokoyama et al. |
| 4,582,816 A | 4/1986 | Miro |
| 4,621,952 A | 11/1986 | Aronson |
| 4,803,251 A | 2/1989 | Goode et al. |
| 4,855,370 A | 8/1989 | Chirillo et al. |
| 4,933,149 A | 6/1990 | Rhee et al. |
| 5,026,795 A | 6/1991 | Hogan |
| 5,391,654 A | 2/1995 | Ahvenainen et al. |
| 6,878,784 B1 * | 4/2005 | Asumalahti ......... C08L 23/0815 526/64 |
| 2015/0315316 A1 * | 11/2015 | Jayaratne .............. C08F 210/16 502/154 |

FOREIGN PATENT DOCUMENTS

| | | |
|---|---|---|
| EP | 0047077 A1 | 3/1982 |
| EP | 0188125 A2 | 7/1986 |
| EP | 0250169 A2 | 12/1987 |
| EP | 0372239 A2 | 6/1990 |
| EP | 0376936 A2 | 7/1990 |
| EP | 0424049 A2 | 4/1991 |
| EP | 0479186 A2 | 4/1992 |
| EP | 0499759 A1 | 8/1992 |
| EP | 0560035 A1 | 9/1993 |

(Continued)

OTHER PUBLICATIONS

Barrios, et al, "Lynx (R) 200: An Advanced Ziegler-Natta Type Catalyst for Polyethylene Production," Vision Tecnologica, vol. 9, No. 2, 2002, 75-80. (Year: 2002).*
D. Geldart et al., "The Design of Distributors for Gas-Fluidized Beds" Powder Technology, 1985, pp. 67-78, vol. 42, Elsevier Sequoia, The Netherlands.
Geldart, "Gas Fluidization Technology", 1986, pp. 170-183, J. Wiley & Sons.
Katja Klimke et al., "Optimisation and Application of Polyolefin Branch Quantification by Melt-State 13C NMR Spectroscopy", Macromolecular Chemistry and Physics, 2006, pp. 382-395, vol. 207, Wiley-VCH Verlag GmbH & Co. KGaA, Weinheim.
Matthew Parkinson et al., "Effect of Branch Length on 13C NMR Relaxation Properties in Molten Poly[ethylene-co-(α-olefin)] Model Systems", Macromolecular Chemistry and Physics, 2007, pp. 2128-2133, vol. 208, Wiley-VCH Verlag GmbH & Co. KGaA, Weinheim.

(Continued)

Primary Examiner — Fred M Teskin
(74) Attorney, Agent, or Firm — Ditthavong, Steiner & Mlotkowski

(57) ABSTRACT

A polyethylene composition comprising a base resin is disclosed herein. The base resin includes an ethylene homo- or copolymer fraction (A1), and an ethylene homo- or copolymer fraction (A2). Fraction (A1) has a lower weight average molecular weight than fraction (A2). The base resin has a melt flow rate $MFR_{21}$ of equal to or less than 8.0 g/10 min and a density of 930 to 950 kg/m3. The polyethylene composition has a melt flow rate $MFR_5$ of 0.01 to 0.3 g/10 min, a flow rate ratio $FRR_{21/5}$ of equal to or more than 20 and a ratio of the weight average molecular weight and the number average molecular weight ($M_w/M_n$) of equal to or less than 30. Also the polyethylene composition has a tensile modulus of less than 1000 MPa. Also a process for the production of a polyethylene composition comprising polyethylene base resin is disclosed herein.

15 Claims, No Drawings

(56) References Cited

FOREIGN PATENT DOCUMENTS

| | | |
|---|---|---|
| EP | 0579426 A1 | 1/1994 |
| EP | 0600414 A1 | 6/1994 |
| EP | 0683176 A1 | 11/1995 |
| EP | 0614467 B1 | 2/1996 |
| EP | 0721798 A2 | 7/1996 |
| EP | 0699213 B1 | 2/1998 |
| EP | 0684871 B1 | 5/1998 |
| EP | 0707513 B1 | 9/1998 |
| EP | 0655073 B1 | 12/1998 |
| EP | 0891990 A2 | 1/1999 |
| EP | 0696293 B1 | 5/2000 |
| EP | 1310295 A1 | 5/2003 |
| EP | 1415999 A1 | 5/2004 |
| EP | 1574549 A1 | 9/2005 |
| EP | 1591460 A1 | 11/2005 |
| EP | 1600276 A1 | 11/2005 |
| EP | 2130863 A1 | 12/2009 |
| EP | 3009456 A1 | 4/2016 |
| EP | 3009457 A1 | 4/2016 |
| GB | 1272778 A | 5/1972 |
| WO | 9425495 A1 | 11/1994 |
| WO | 9619503 A1 | 6/1996 |
| WO | 9632420 A1 | 10/1996 |
| WO | 0026258 A1 | 5/2000 |
| WO | 0029452 A1 | 5/2000 |
| WO | 0105845 A1 | 1/2001 |
| WO | 02088194 A1 | 11/2002 |
| WO | 2005087361 A1 | 9/2005 |
| WO | 2007025640 A1 | 3/2007 |
| WO | 2008040504 A1 | 4/2008 |
| WO | 2008064809 A1 | 6/2008 |
| WO | 2008064810 A1 | 6/2008 |

OTHER PUBLICATIONS

M. Pollard et al., "Observation of Chain Branching in Polyethylene in the Solid State and Melt via 13C NMR Spectroscopy and Melt NMR Relaxation Time Measurements", Macromolecules, 2004, pp. 813-825, vol. 37, American Chemical Society.

Xenia Filip et al., "Heteronuclear decoupling under fast MAS by a rotor-synchronized Hahn-echo pulse train", Journal of Magnetic Resonance, 2005, pp. 239-243, vol. 176, Elsevier Inc.

John M. Griffin et al., "Low-load rotor-synchronised Hahn-echo pulse train (RS-HEPT) H decoupling in solid-state NMR: factors affecting MAS spin-echo dephasing times", Magnetic Resonance in Chemistry, 2007, pp. S198-S208, vol. 45, John Wiley & Sons, Ltd.

Patrice Castignolles et al., "Detection and quantification of branching in polyacrylates by size-exclusion chromatography (SEC) and melt-state 13C NMR spectroscopy", Polymer, 2009, pp. 2373-2383, vol. 50, Elsevier Ltd.

James C. Randall, "A Review of High Resolution Liquid 13Carbon Nuclear Magnetic Resonance Characterizations of Ethylene-Based Polymers", Macromolecular Chemistry and Physics, 1989, pp. 201-317, vol. C29, Marcel Dekker, Inc.

International Search Report and Written Opinion of the International Searching Authority issued in International Application No. PCT/EP2017/062902 dated Jul. 17, 2017.

\* cited by examiner

POLYMER COMPOSITION AND A PROCESS FOR PRODUCTION OF THE POLYMER COMPOSITION

BACKGROUND OF THE INVENTION

This disclosure relates generally to a polymer composition and a process for production of the polymer composition. Especially, the disclosure relates to a multimodal ethylene composition comprising at least two ethylene homo- or copolymer fractions. Also the disclosure relates to an article, such as a pipe or fitting made of the polymer composition and a use of the polymer composition for the production of the article.

Pipes made from polymer compositions have many purposes of use, such as to transport liquids or gas. Typically pipes must be able to withstand pressure, because liquids or gas usually are pressurised. Polymer compositions comprising polyethylenes are nowadays frequently used for manufacturing pipes. Such polymer compositions may comprise e.g. two or more polyethylene fractions with different weight average molecular weights. Such polymer compositions are frequently called multimodal and they have good chemical and physical properties. Fractions may contain ethylene homo- or copolymers. The content of comonomer can be varied as well as the type of the comonomer, which usually is alpha-olefin comonomer. The composition of each of the fractions as well as the relative proportions between the fractions (often called as the split) has significant influence on the properties of the multimodal composition. Furthermore, the polymerisation conditions, e.g., reactor types, reactant concentrations and the type of the polymerisation catalyst have a remarkable influence on properties of fractions.

EP 1574549 discloses a pipe made of a bimodal linear low density polyethylene composition. Either Ziegler-Natta catalyst or metallocene catalyst were used in the preparation. The composition has a density (ISO 1183) of 910-940 kg/m$^3$, an E-modulus (ISO 527) in the range of <800 MPa and a melt flow rate (MFR$_2$) at 190° C./2 kg of <2 g/10 min. The pressure resistance data of bimodal polyethylene materials polymerized in the presence of Ziegler-Natta catalyst are on the level of PE80 requirements.

WO 2008/064809 discloses a polyethylene composition comprising a polyethylene base resin, which comprises two fractions. The first fraction is an ethylene copolymer and the second one is either ethylene homo- or copolymer having a higher molecular weight than the first fraction. A single-site catalyst (SSC) is used to polymerize first and second fractions. A density of the base resin is less than 940 kg/m$^3$ and a melt flow rate (MFR$_2$) at 190° C./2.16 kg is 0.01-10 g/10 min. The composition has a flexural modulus of from 300 to 820 MPa. This composition is intended for flexible PE 100 materials, but the base resin made in the presence of SSC suffer from low processability and low resistance to sagging due to narrow molecular weight distribution (MWD) and a lack of high molecular weight (HMW) tail.

WO 2008/064810 discloses a pipe made of a polyethylene composition comprising a polyethylene base resin. The first fraction is an ethylene copolymer and the second one is either ethylene homo- or copolymer having a higher molecular weight than the first fraction. A single-site catalyst (SSC) is used to polymerize at least one of the first and second fractions. The density of the base resin is less than 940 kg/m$^3$ and a melt flow rate (MFR$_5$) at 190° C./5.00 kg is at least 0.20 g/10 min. The polyethylene composition has a time to failure of at least 250 h measured according to ISO 1167 at 95° C. and 4.3 MPa. This composition is also intended for flexible PE 100 materials, but the base resin made in the presence of SSC suffer from low processability and low resistance to sagging due to narrow molecular weight distribution (MWD) and a lack of high molecular weight (HMW) tail.

WO 2008/040504 discloses a polyethylene composition comprising a base resin comprising two ethylene homo- or copolymer fractions. The polyethylene compositions of the examples have a flow rate ratio FRR$_{21/5}$, which is the ratio of MFR$_{21}$ and MFR$_5$, of 19.6 to 20.8. The shear thinning index SHI$_{(2.7/210)}$, which is a ratio of the viscosities of the polyethylene base resin at shear stresses of 2.7 kPa and 210 kPa was less than 20. These results serve as a measure of the broadness of the molecular weight distribution, which is comparatively narrow. Such narrow polymers suffer from low processability and low resistance to sagging.

It is desirable to have pipes of good coilability facilitating easy installation and avoiding fractures in the material; if the pipe is too stiff fractures may occur. Therefore the density of material needs to be sufficiently low, but generally a low density corresponds to a poor pressure resistance. The flexibility of the material should be at least on the same level as that of the PE80 resins but the pressure resistance should meet the requirements of the PE100 materials. According to ISO 9080 polyethylene pipes are classified by their minimum required strength, i.e. their capacity to withstand different hoop stresses during 50 years at 20° C. without fracturing. PE80 pipes withstand a hoop stress of 8.0 MPA (MRS8.0) and PE100 pipes withstand a hoop stress of 10.0 MPa (MRS10:0). To meet the PE80 requirements with multimodal resins manufactured by conventional Ziegler-Natta catalyst the density needs to be at least 940 kg/m$^3$ and to meet the PE100 requirements the density needs to be above 945 kg/m$^3$. Usually, the lower is the density of the material, the better is the flexibility.

BRIEF DESCRIPTION OF THE INVENTION

The deficiencies, drawbacks and problems mentioned above are addressed herein and can be understood by reading the detailed account.

In an embodiment, the present invention provides a polyethylene composition comprising a base resin includes an ethylene homo- or copolymer fraction (A1); and an ethylene homo- or copolymer forming fraction (A2). Fraction (A1) has a lower weight average molecular weight than fraction (A2). The base resin has a density of 930 to 950 kg/m$^3$. The polyethylene composition has a melt flow rate MFR$_5$ of 0.01 to 0.65 g/10 min and a flow rate ratio FRR$_{21/5}$ of equal to or more than 20. Also the polyethylene composition has a tensile modulus of less than 1000 MPa.

In another embodiment, the present invention provides a process for the production of a polyethylene composition comprising polyethylene base resin includes steps of polymerising ethylene and optionally at least one comonomer in the presence of a polymerisation catalyst to form an ethylene homo- or copolymer fraction (A1), and polymerising ethylene and optionally at least one comonomer in the presence of same or different polymerisation catalyst(s) as polymerising the fraction (A2) to form an ethylene homo or copolymer fraction (A2). Fraction (A1) has a lower weight average molecular weight than fraction (A2). At least one of the catalyst(s) is a Ziegler-Natta (ZN) catalyst. The base resin has a density of 930 to 950 kg/m$^3$. The polyethylene composition has a melt flow rate MFR$_5$ of 0.01 to 0.65 g/10 min and a flow rate ratio $FRR_{21/5}$ of equal to or more than 20. Also the polyethylene composition has a tensile modulus of less than 1000 MPa.

In yet another embodiment, the present invention provides an article, such as a pipe or fitting, made of the polyethylene composition as hereinbefore described.

In yet another embodiment, the present invention provides a use of the polyethylene composition for the production of the article as hereinbefore defined.

DETAILED DESCRIPTION OF THE INVENTION

The following detailed description includes specific embodiments, which should not limit the scope of the invention and the embodiments can be modified as set forth in the claims.

The invention applies to a polyethylene composition, which can be used to make flexible articles with good pressure resistance. The flexibility of the material may be similar to that of PE 80 materials, or advantageously better than that, but the pressure resistance is at the same level or better than that of PE 100 materials.

In the context of the present application the term fraction denotes a polymer which has been produced in the presence of one polymerisation catalyst in one set of polymerisation conditions. Thereby two fractions may be produced by polymerising ethylene in two cascaded polymerisation reactors wherein the reactors are operated in different polymerisation conditions resulting in different molecular weights and/or comonomer contents of the polymer. Alternatively, two fractions may be produced by polymerising ethylene in one polymerisation reactor by using two polymerisation catalysts where the catalysts have different selectivity towards the reactants. Again, two fractions having different molecular weights and/or comonomer contents are produced.

The polyethylene composition comprises a base resin including at least two different polyethylene component fractions called herein fraction A1 and fraction A2. Usually all polymer material of the polyethylene components is included in the base resin. Each fraction may have been produced under different polymerisation conditions, the polymer component of fraction A1 in a first polymerisation stage in a first reactor and the polymer component of fraction A2 in a second polymerisation stage in a second reactor, resulting in different weight average molecular weights and molecular weight distributions. Typically the same polymerisation catalyst may be used in both reactors. Also it is possible to produce under same polymerisation condition in the same reactor e.g. the first reactor in the presence of two different polymerisation catalysts both the polymer component of fraction A1 and fraction A2. In that case there may be only one polymerisation stage. Further fractions A1 and A2 may be mixed to produce the polyethylene base resin. The polymer component of fraction A1 may have a lower weight average molecular weight than the polymer component of fraction A2.

Optionally the base resin may comprise a prepolymer fraction in an amount of up to 10 wt %, preferably up to 8 wt %, more preferably up to 7 wt %.

The composition or the base resin comprising more than one fraction is called "multimodal". If the multimodal composition comprises two fractions, it is called "bimodal". According to the specific example the composition or base resin is bimodal, when the prepolymer fraction is not included. The form of the molecular weight distribution curve, i.e. the appearance of the graph of the polymer weight fraction as function of its molecular weight, of such a multimodal polyethylene will show two or more maxima or at least be distinctly broadened in comparison with the curves for the individual fractions.

Fraction A1 may be an ethylene homopolymer or advantageously an ethylene copolymer. Fraction A2 may be an ethylene homopolymer or advantageously an ethylene copolymer. The comonomer contents of the fractions may be, and preferably are, different. Typically the comonomer content of fraction A1 is lower than the comonomer content of fraction A2. Further the comonomer molecule of fraction A1 may differ from the comonomer molecule of fraction A2. Usually comonomers are selected from alpha-olefin comonomers with 3-12 carbon atoms, more preferably 4-8 carbon atoms. Preferably the comonomer molecule of fraction A1 includes less carbon atoms than the comonomer molecule of fraction A2. Preferably the comonomer of fraction A1 is 1-butene and the comonomer of fraction A2 is 1-hexene, but naturally the same comonomer may be used.

A melt flow rate $MFR_2$ of fraction A1 according to the invention is suitably from 20 to 1000 g/10 min, preferably 40 to 700 g/10 min, more preferably 60 to 400 g/10 min, even more preferably 70 to 300 g/10 min.

A density of fraction A1 according to the invention is suitably from 940 to 980 $kg/m^3$, preferably 950 to 977 $kg/m^3$, more preferably 955 to 974 $kg/m^3$.

The amount of fraction A1 in the base resin according to the invention is suitably 30 to 65 wt %, preferably 35 to 60 wt %, more preferably 40 to 55 wt %, even more preferably 40 to 50 wt %.

A density of the base resin including fractions A1 and A2 may be equal to or less than 950 $kg/m^3$, preferably equal to or less than 947 $kg/m^3$, more preferably equal to or less than 946 $kg/m^3$, even more preferably equal to or less than 945 $kg/m^3$. The density of base resin is equal to or more than 930 $kg/m^3$, preferably equal to or more than 933 $kg/m^3$, more preferably equal to or more than 935 $kg/m^3$, even more preferably equal to or more than 937 $kg/m^3$. The density range of the base resin may be 930 to 950 $kg/m^3$, preferably 933 to 947 $kg/m^3$, more preferably 935 to 946 $kg/m^3$, even more preferably 937 to 945 $kg/m^3$. The density of the base resin is close to the densities typically seen in PE 80 materials showing that the flexibility is sufficient e.g. for the pipe requiring good coilability to facilitate installation.

A melt flow rate $MFR_5$ of base resin according to the invention is equal to or less than 0.65 g/10 min, preferably equal to or less than 0.5 g/10 min, more preferably equal to or less than 0.3 g/10 min, even more preferably equal or less than 0.2 g/10 min. The $MFR_5$ of base resin is equal or higher than 0.01 g/10 min, preferably equal to or higher than 0.05 g/10 min, more preferably equal to or higher than 0.09 g/10 min or even more preferably equal to or higher than 0.10 g/10 min. The $MFR_5$ range of the polymer composition or the base resin may be 0.01 to 0.65 g/10 min, preferably 0.05 to 0.5 g/10 min, more preferably 0.1 to 0.3 g/10 min or even more preferably 0.1 to 0.2 g/10 min. MFR is an indication of flowability, and hence the processability of the polymer. The higher the melt flow rate, the lower the viscosity of the polymer composition or the base resin.

The base resin according to the invention has a melt flow rate $MFR_{21}$, of equal to or less than 8.0 g/10 min, preferably equal to or less than 7.0 g/10 min, more preferably equal to or less than 6.0 g/10 min, even more preferably equal to or less than 5.0 g/10 min. The $MFR_{21}$, of the base resin is equal to or higher than 1.0 g/10 min, preferably equal to or higher than 2.0 g/10 min, more preferably equal to or higher than 3.0 g/10 min or even more preferably equal to or higher than 4.0 g/10 min. The $MFR_{21}$, range of the base resin may be 1.0 to 8.0 g/10 min, preferably 2.0 to 7.0 g/10 min, more preferably 3.0 to 6.0 g/10 min.

The amount of fraction A2 in the base resin according to the invention may be 35 to 70 wt %, preferably 40 to 65 wt %, more preferably 45 to 60 wt %, even more preferably 45 to 55 wt %.

The polyethylene composition or the base resin has a flow rate ratio $FRR_{21/5}$, which is the ratio of $MFR_{21}$ and $MFR_5$ of equal to or less than 45, preferably equal to or less than 40, more preferably less than 35. The flow rate ratio $FRR_{21/5}$ is equal to or more than 20, preferably equal to or more than 25, more preferably equal to or more than 27, even more preferably equal to or more than 30.

Polyethylene base resin may comprise at least 0.5 mol %, preferably at least 0.55 mol %, and more preferably at least 0.6 mol % of at least one alpha-olefin comonomer, such as 1-hexene.

A good processability of the polyethylene composition is desirable especially for pipe applications. High molecular weight is needed for meeting the requirements of good pressure resistance at elevated temperatures and low creep, however, processing of such high molecular weight resins is more difficult. Improved processability is reached by multimodal design of the base resin. Therefore at least one lower molecular weight fraction A1 is needed for easier processability of the composition, while a higher molecular weight fraction A2 contributes to the mechanical strength of the composition.

The term molecular weight denotes herein the weight average molecular weight $M_w$. In accordance with the invention the base resin or the polyethylene composition suitably has a molecular weight $M_w$ of at least 150000 g/mol, preferably at least 180000 g/mol, more preferably at least 200000 g/mol. The base resin or the polyethylene composition suitably has a molecular weight $M_w$ of less than 400000 g/mol, preferably less than 350000 g/mol, more preferably less than 300000 g/mol.

The number average molecular weight $M_n$ of the polyethylene composition or base resin is suitably higher than 7000 g/mol, preferably higher than 8000 g/mol, more preferably higher than 9000 g/mol. The number average molecular weight $M_n$ of the polyethylene composition or base resin is suitably less than 20000 g/mol, preferably less than 18000 g/mol, more preferably less than 16000 g/mol.

The molecular weight distribution MWD can be calculated as the ratio of the weight average molecular weight to the number average molecular weight, $M_w/M_n$. The composition or the base resin suitably has $M_w/M_n$ of equal to or less than 35, preferably equal to or less than 30, more preferably equal to or less than 25, even more preferably equal to or less than 23. The composition or the base resin has $M_w/M_n$ of equal to or greater than 5, preferably equal to or greater than 10, more preferably equal to or greater than 15, even more preferably equal to or greater than 18.

The composition or the base resin suitably has a polydispersity index PI of equal to or less than 5 $Pa^{-1}$, preferably equal to or less than 4.5 $Pa^{-1}$, more preferably equal to or less than 4.0 $Pa^{-1}$, even more preferably equal to or less than 3.5 $Pa^{-1}$. The composition or the base resin has PI of equal to or greater than 1.0 $Pa^{-1}$, preferably equal to or greater than 1.5 $Pa^{-1}$, more preferably equal to or greater than 1.8 $Pa^{-1}$, even more preferably equal to or greater than 2.0 $Pa^{-1}$.

The shear thinning index SHI is the ratio of the viscosity of the polyethylene composition at different shear stresses. In the invention, the shear stresses at 2.7 kPa and 210 kPa are used for calculating the SHI(2.7/210) which may serve as a measure of the broadness of the molecular weight distribution.

The SHI of the polyethylene composition or the base resin is suitably 25 to 65, preferably 30 to 60, more preferably 35 to 55, even more preferably 40 to 50. Such SHI values indicate that the polymer has a broad molecular weight distribution. For the processability of the composition the broad molecular weight distribution is preferred.

The polyethylene composition or the base resin suitably has a viscosity at shear stress of 747 Pa (eta747) of 300 to 700 kPas, preferably 400 to 700 kPas, more preferably of 450 to 690 kPas, most preferably of 500 to 650 kPas. The higher eta747 is, the lower is the tendency of sagging of the polyethylene composition. The high eta747 indicates the presence of high molecular weight polymer chains and also high $M_w$.

The polyethylene composition or the base resin suitably has a complex viscosity at 0.05 rad/s $Eta_{0.5\ rad/s}$ of 150 to 250 kPa·s, preferably of 170 to 235 kPa·s, more preferably of 180 to 230 kPa·s.

Also the polyethylene composition or the base resin suitably has a complex viscosity at 300 rad/s $Eta_{300\ rad/s}$ of 1000 to 1600 Pa·s, preferably of 1100 to 1500 Pa·s, more preferably of 1200 to 1480 Pa·s.

The polyethylene composition or the base resin suitably has a ratio of $Eta_{0.05\ rad/s}$ to $Eta_{300\ rad/s}$ of 110 to 180, preferably of 130 to 170, more preferably 135 to 165.

The polyethylene composition preferably has a white spot rating of less than 7.0, more preferably of less than 5.5.

The strain hardening modulus of the polyethylene composition comprising the base resin and carbon black is rather high, which is an indication of improved resistance to Slow Crack Growth (SCG). It is important for the lifetime of the pipe. The polyethylene composition suitably has a strain hardening modulus of more than 75 MPa, preferably more than 80 MPa, more preferably more than 90 MPa.

The polyethylene composition suitably has a time to failure of at least 400 h, preferably at least 1000 h, more preferably at least 2000 h measured according to ISO 1167 at 80° C. and 5.4 MPa.

The polyethylene composition suitably has a time to failure of at least 40 h, preferably at least 60 h, more preferably at least 80 h, more preferably at least 100 h measured according to ISO 1167 at 80° C. and 5.6 MPa.

The polyethylene composition has rather low tensile modulus, which is a measure of stiffness and thus in this case is an indication of better flexibility compared to many known materials. The tensile modulus of the polyethylene composition is not more than 1000 MPa, preferably not more than 950 MPa, more preferably not more than 930 MPa. The polyethylene composition has a tensile modulus of at least 700 MPa, preferably of at least 750 MPa, even more preferably of at least 800 MPa. The amount of base resin in this composition may be then at least 85 wt %, preferably at least 90 wt %, more preferably at least 95 wt %.

Catalyst

The solid catalyst component used in copolymerisation of ethylene is a solid Ziegler-Natta catalyst component for ethylene polymerisation, which solid Ziegler-Natta catalyst component comprises magnesium, titanium, halogen and an internal organic compound. The internal donor is selected from bi-(oxygen containing ring) compounds of formula (I) or isomers or mixtures therefrom

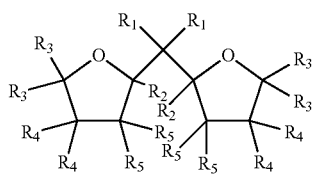

(I)

where $R_1$ to $R_5$ are the same or different and can be hydrogen, a linear or branched $C_1$ to $C_8$-alkyl group, or a $C_3$-$C_8$-alkylene group, or two or more of $R_1$ to $R_5$ can form a ring, The two oxygen-containing rings are individually saturated or partially unsaturated or unsaturated.

Accordingly, the catalyst used in the present invention comprises a solid $MgCl_2$ supported component which is prepared by a method comprising the steps:

a) providing solid carrier particles of $MgCl_2$*mROH adduct b) pre-treating the solid carrier particles of step a) with a compound of Group 13 metal c) treating the pre-treated solid carried particles of step b) with a transition metal compound of Group 4 to 6 d) recovering the solid catalyst component wherein the solid carrier particles are contacted with an internal organic compound of formula (I) or isomers or mixtures therefrom before treating the solid carrier particles in step c)

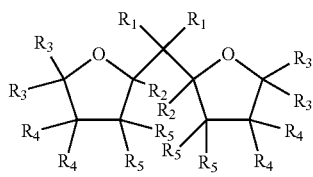

(I)

and wherein in the formula (I) or isomers or mixtures therefrom $R_1$ to $R_5$ are the same or different and can be hydrogen, a linear or branched $C_1$ to $C_8$-alkyl group, or a $C_3$-$C_8$-alkylene group, or two or more of $R_1$ to $R_5$ can form a ring, the two oxygen-containing rings are individually saturated or partially unsaturated or unsaturated, and R in the adduct $MgCl_2$*mROH is a linear or branched alkyl group with 1 to 12 C atoms, and m is 0 to 6.

Accordingly, the internal organic compound of formula (I) is contacted with the solid carrier particles before treatment of solid carrier particles with the transition metal compound of Group 4 to 6. Thus, said internal organic compound can be contacted with the solid carrier particles before step b), i.e. before pre-treating the solid carrier particles with Group 13 metal compound, or simultaneously with said pre-treatment step, or after step b), but before treating the solid carrier particles with the transition metal compound of Group 4 to 6.

Further, one object of the invention is to use the catalyst in accordance to what was disclosed above in the process for producing polyethylene in a multistage process.

The catalyst will be described in the following in greater detail, referring to the particular preferred embodiments.

As used herein, the term Ziegler Natta (ZN) catalyst component is intended to cover a catalyst component comprising a transition metal compound of Group 4 to 6, a compound of a metal of Group 13 of the Periodic Table (IUPAC, Nomenclature of Inorganic Chemistry, 1989) and an internal organic compound supported on $MgCl_2$ based carrier.

Magnesium dihalide is used as a starting material for producing a carrier. The solid carrier is a carrier where alcohol is coordinated with Mg dihalide, preferably $MgCl_2$. The $MgCl_2$ is mixed with an alcohol (ROH) and the solid carrier $MgCl_2$*mROH is formed according to the well-known methods. As examples, spray drying or spray crystallisation methods can be used to prepare the magnesium halide. Spherical and granular $MgCl_2$*mROH carrier materials of different sizes (5-100 μm) are suitable to be used in the present invention. The alcohol in producing $MgCl_2$*mROH carrier material is an alcohol ROH, where R is a linear or branched alkyl group containing 1 to 12 carbon atoms, preferably 1 to 8 carbon atoms, like 1 to 4 carbon atoms. Ethanol is typically used. In $MgCl_2$*mROH, m is from 0 to 6, more preferably from 1 to 4, especially from 2.7 to 3.3.

$MgCl_2$*mROH is available from commercial sources or can be prepared by methods described in prior art. Preparation methods of $MgCl_2$*mROH carrier is described in several patents e.g. in EP-A-376936, EP-A-424049, EP-A-655073 and EP-A-614467.

Group 13 metal compound, used in step b) is preferably an aluminium compound. Particularly preferably the aluminium compound is an aluminium compound of the formula $Al(alkyl)_xX_{3-x}$ (II), wherein each alkyl is independently an alkyl group of 1 to 12 carbon atoms, preferably 1 to 8 carbon atoms, more preferably 1 to 6 carbon atoms, X is halogen, preferably chlorine and $1<x\leq3$. The alkyl group can be linear, branched or cyclic, or a mixture of such groups.

Preferred aluminium compounds are dialkyl aluminium chlorides or trialkyl aluminium compounds, for example dimethyl aluminium chloride, diethyl aluminium chloride, di-isobutyl aluminium chloride, and triethylaluminium or mixtures therefrom. Most preferably the aluminium compound is a trialkyl aluminium compound, especially triethylaluminium compound.

The transition metal compound of Group 4 to 6 is preferably a Group 4 transition metal compound or a vanadium compound and is more preferably a titanium compound. Particularly preferably the titanium compound is a halogen-containing titanium compound of the formula $X_y Ti(OR^8)_{4-y}$, wherein $R^8$ is a $C_1$-20 alkyl, preferably a $C_{2-10}$ and more preferably a $C_{2-8}$ alkyl group, X is halogen, preferably chlorine and y is 1, 2, 3 or 4, preferably 3 or 4 and more preferably 4.

Suitable titanium compounds include trialkoxy titanium monochlorides, dialkoxy titanium dichloride, alkoxy titanium trichloride and titanium tetrachloride. Preferably titanium tetrachloride is used.

The internal organic compound is selected from bi-cyclic ether compounds of formula (I) or isomers or mixtures therefrom:

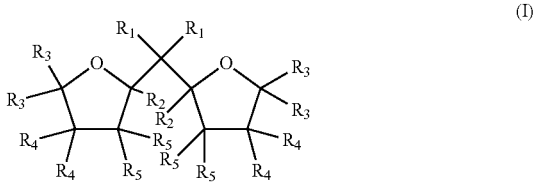

(I)

wherein in the formula (I)

$R_1$ to $R_5$ are the same or different and can be hydrogen, a linear or branched $C_1$ to $C_8$-alkyl group, or a $C_3$-$C_8$-alkylene group, or two or more of $R_1$ to $R_5$ can form a ring, and whereby the two oxygen-containing rings are individually saturated or partially unsaturated or unsaturated.

Examples of preferred linear or branched $C_1$ to $C_8$-alkyl groups are methyl, ethyl, n-propyl, i-propyl, n-butyl, sec-butyl, tert-butyl, pentyl and hexyl groups.

Examples for preferred $C_3$-$C_8$-alkylene groups are pentylene and butylene groups.

The two $R_1$ are preferably the same and are a linear $C_1$ to $C_4$-alkyl groups, more preferably methyl or ethyl; or the two $R_1$ form a ring with the carbon atom they are attached to a ring with 3 to 7 carbon atoms, preferably cyclopentyl or cyclohexyl ring.

Most preferably both $R_1$ are methyl.

$R_2$ to $R_5$ are the same or different and are preferably H or a $C_1$ to $C_2$-alkyl groups, or two or more of $R_2$ to $R_5$ residues can form a ring. If one or more rings are formed by the residues $R_2$ to $R_5$, these are more preferably formed by $R_3$ and $R_4$ and/or $R_4$ and $R_5$.

Preferably the residues $R_2$ to $R_5$ do not form rings and more preferably at most two of the residues $R_2$ to $R_5$ are a methyl, the others are H. Most preferably $R_2$ to $R_5$ are all hydrogens.

Furthermore both oxygen-containing rings are preferably saturated or partially unsaturated or unsaturated. Each partially unsaturated or unsaturated oxygen-containing ring can have one or two double bonds.

More preferably both oxygen-containing rings are saturated.

In the most preferred embodiment, 2,2-di(2-tetrahydrofuryl)propane (DTHFP) is used with the isomers thereof. DTHFP is typically a 1:1 mol/mol diastereomeric mixture of D,L-(rac)-DTHFP and meso-DTHFP.

It has been found that using an internal organic compound that is enriched in isomers of DTHFP, that the catalyst morphological properties are not influenced. It was found that by using enriched rac-DTHFP, where the ratio of D,L-(rac)-DTHFP/meso-DTHFP is at least 2/1 mol/mol, it was possible to produce the catalyst morphology as good as with the equimolar (rac) and (meso) mixture.

Enrichment was surprisingly successful via complexation with $MgCl_2$.

When producing the supported catalyst component used in the present invention it is especially preferred that the internal organic compound, as defined above, is added to the catalyst mixture before, during or after the pre-treating of the $MgCl_2$-mROH with the Group 13 metal compound, but before treating it with the compound of a transition metal of Group 4 to 6.

Thus, according to one suitable method the solid catalyst component is prepared by a process comprising the steps of:

i) providing solid $MgCl_2$*mROH carrier, wherein m is 1 to 4 and R is a linear or branched alkyl group containing 1 to 8 C atoms ii) pre-treating the solid carrier particles of step i) with an Al compound iii) adding the internal organic compound of formula (I) into the pre-treated solid carrier of step ii) or iii') simultaneously with step ii) adding the internal organic compound of formula (I) into the solid carrier iv) treating the pre-treated solid carried particles of step iii) or iii') with $TiCl_4$ and v) recovering the solid catalyst component Thus, according to another suitable method the solid catalyst component is prepared by a process comprising the steps of:

i) providing solid $MgCl_2$*mROH carrier, wherein m is 1 to 4 and R is a linear or branched alkyl group containing 1 to 8 C atoms ii-1) adding the internal organic compound of formula (I) into the solid carrier of step i)

iii-1) pre-treating the solid carrier particles of step ii-1) with an Al compound iv-1) treating the pre-treated solid carried particles of step iii-1) with $TiCl_4$ and v-1) recovering the solid catalyst component.

According to either one of the methods above the Al compound can be added to the solid carrier before or after adding the internal organic compound or simultaneously with the internal organic compound to the carrier.

Most preferably in the above-mentioned embodiments, m=2.7 to 3.3, ROH is ethanol, aluminum compound is an aluminium trialkyl compound, such as triethyl aluminium, and as internal organic compound is 2,2-di(2-tetrahydrofuryl)propane, or 2,2-di-(2-furan)-propane, especially 2,2-di(2-tetrahydrofuryl)propane or isomers or mixtures thereof.

According to the catalyst preparation method of the present invention the pre-treatment with the Group 13 metal compound, preferably an aluminum compound, can be done by adding a solution of said aluminum compound in inert organic solvent, preferably in inert aliphatic hydrocarbon solvent, for example in heptane. The method of the invention allows use of a concentrated aluminum compound solution. In the case where triethylaluminiun (TEA) is used, a 15 to 100 wt-% solution of TEA in an inert hydrocarbon, preferably a 25 to 100 wt-% solution of TEA in inert aliphatic hydrocarbon solvent, like in heptane can be used, or neat TEA. It was found that by using these more concentrated solutions, the morphology remains advantageous and a reduced amount of waste is produced.

The final solid catalyst component typically has Mg/Ti mol/mol ratio of from 1 to 10, preferably from 2 to 8, especially from 3 to 7, Al/Ti mol/mol ratio of from 0.01 to 1, preferably from 0.1 to 0.5 and Cl/Ti mol/mol ratio of from 5 to 20, preferably from 10 to 17.

Particles of the solid catalyst component of the invention are uniform in particle size without fines or agglomerates.

The supported catalyst component as described above allows the production of polymers with increased molecular weight. The increase in molecular weight is not made at the expense of the productivity of the catalyst. The productivity remains at an acceptably high level or is even increased compared to use of a catalyst component of similar type but using a different internal organic compound and/or prepared by adding the internal organic compound during or after the treatment step with $TiCl_4$, or using said organic compound as external additive. Thus, the performance of the catalyst prepared by the method of the present invention makes it possible to broaden the preparation window of the polyethylene such that polymerisation with both higher and lower amounts of hydrogen is possible while retaining good productivity.

The catalyst used in the process of the invention comprises, in addition to the solid catalyst component as defined above, a cocatalyst, which is also known as an activator. Cocatalysts are organometallic compounds of Group 13 metal, typically aluminum compounds. These compounds include alkyl aluminium halides, preferably alkyl aluminium chlorides, such as ethylaluminium dichloride, diethylaluminium chloride, ethylaluminium sesquichloride, dimethylaluminium chloride and the like. They also include trialkylaluminium compounds, such as trimethylaluminium, triethylaluminium, tri-isobutylaluminium, trihexylaluminium and tri-n-octylaluminium. Also other aluminium alkyl compounds, such as isoprenylaluminium, may be used. Especially preferred cocatalysts are trialkylaluminiums, of which triethylaluminium, trimethylaluminium and tri-isobutylaluminium are particularly used.

The catalyst of the invention may also comprise an external additive, like external donor. External additives that can be used include ether compounds, typically tetrahydrofuran, siloxane or silane type of external donors and/or alkyl halides as is known from prior art. The final solid catalyst component, i.e. the ZN solid catalyst component, obtained according to any one of the above described methods, is combined with an activator.

Suitable activators are optionally halogenated aluminium alkyl cocatalysts of formula (V) $(C_1\text{-}C_4\text{-alkyl})_p\text{-Al}\text{—}X_{3-p}$, wherein X is chlorine, bromine, iodine or fluorine and p is 1, 2 or 3.

The $C_1\text{-}C_4$-alkyl groups can be linear or branched or cyclic, or a mixture of such groups.

X is preferably chlorine or bromine, most preferably X is chlorine.

Suitable activators are for example trimethyl aluminium (TMA), triethyl aluminium (TEA) dimethyl aluminium chloride (DMAC), diethyl aluminium chloride (DEAC), diisobutyl aluminium chloride (DIBAC), ethyl aluminium dichloride (EADC), methyl aluminium dichloride (MADC). A preferred activator used in the process of the invention is triethylaluminium.

The amount in which the activator is used depends on the specific catalyst and the activator. Typically triethylaluminium is used in such amount that the molar ratio of aluminium to the transition metal, like Al/Ti, is from 1 to 1000, preferably from 3 to 100 and in particular from about 5 to about 30 mol/mol.

Polymerisation

The multimodal polyethylene composition may be produced in a multistage polymerization process in the presence of Ziegler-Natta catalyst. In accordance with the invention ethylene and alpha-olefin comonomers with 3-12 carbon atoms have been polymerised in a process comprising at least two polymerisation stages. Each polymerisation stage may be conducted in a separate reactor. The polymerisation can be conducted in at least two consecutive polymerisation stages. The polymerisation may be followed by a compounding step.

The base resin of the polyethylene composition is suitably polymerised in a cascaded process comprising at least one slurry phase reactor and at least one gas phase reactor. Fraction A1 may be polymerised in a slurry phase reactor, preferably loop reactor, and fraction A2 may be polymerised in a gas phase reactor. Typically the order is first the loop reactor and then the gas phase reactor, but as well the order when polymerising could be first the gas phase reactor and then the loop reactor. According to the embodiment fraction A1 is polymerised in the first reaction stage and fraction A2 in the second reaction stage in the presence of fraction A1. The components from these reactors in series are mainly mixed, since fraction A1 is included when polymerising fraction A2 in the second stage. The same polymerisation catalyst may be used in both reactors. Also it is possible to produce under same polymerisation condition in the same first or second reactor in the presence of two different polymerisation catalysts both the polymer component of fraction A1 and fraction A2.

Optionally the reaction stage in a slurry phase reactor is preceded by a prepolymerisation stage in a slurry phase reactor. The purpose of the prepolymerisation is to polymerise a small amount of polymer onto the catalyst at a low temperature and/or a low monomer concentration. By prepolymerisation it is possible to improve the performance of the catalyst in slurry and/or modify the properties of the final polymer.

Thus, the prepolymerisation step may be conducted in a loop reactor. The prepolymerisation is then preferably conducted in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons.

The temperature in the prepolymerisation step is typically from 0 to 90° C., preferably from 20 to 80° C. and more preferably from 55 to 75° C.

The pressure is not critical and is typically from 1 to 150 bar, preferably from 40 to 80 bar.

The amount of monomer is typically such that from about 0.1 to 1000 grams of monomer per one gram of solid catalyst component is polymerised in the prepolymerisation step. As the person skilled in the art knows, the catalyst particles recovered from a continuous prepolymerisation reactor do not all contain the same amount of prepolymer. Instead, each particle has its own characteristic amount which depends on the residence time of that particle in the prepolymerisation reactor. As some particles remain in the reactor for a relatively long time and some for a relatively short time, then also the amount of prepolymer on different particles is different and some individual particles may contain an amount of prepolymer which is outside the above limits. However, the average amount of prepolymer on the catalyst typically is within the limits specified above.

The molecular weight of the prepolymer may be controlled by hydrogen as it is known in the art. Further, antistatic additive may be used to prevent the particles from adhering to each other or the walls of the reactor, as disclosed in WO-A-96/19503 and WO-A-96/32420. The catalyst components are preferably all (separately or together) introduced to the prepolymerisation step when a prepolymerisation step is present. However, where the solid catalyst component and the cocatalyst can be fed separately it is possible that only a part of the cocatalyst is introduced into the prepolymerisation stage and the remaining part into subsequent polymerisation stages. Also in such cases it is necessary to introduce so much cocatalyst into the prepolymerisation stage that a sufficient polymerisation reaction is obtained therein.

Typically, the amounts of hydrogen and comonomer are adjusted so that the presence of the prepolymer has no effect on the properties of the final multimodal polymer. Especially, it is preferred that melt flow rate of the prepolymer is greater than the melt flow rate of the final polymer but smaller than the melt flow rate of the polymer produced in the first polymerisation stage. It is further preferred that the density of the prepolymer is greater than the density of the final polymer. Suitably the density is approximately the same as or greater than the density of the polymer produced in the first polymerisation stage. Further, typically the amount of the prepolymer is not more than about 7% by weight of the multimodal polymer comprising the prepolymer.

In the slurry phase reactor when polymerising fraction A1 as an inert diluent may be used hydrocarbon, such as ethane, propane, n-butane etc. Ethylene and optionally hydrogen and comonomer is introduced into the loop reactor to produce low molecular weight polyethylene in the presence of Ziegler-Natta catalyst. Comonomer is 1-butene and the ratio of 1-butene to ethylene may be 3 to 30 mol/kmol, preferably 5 to 25 mol/kmol, more preferably 8 to 20 mol/kmol. Loop reactors are generally known in the art e.g. in U.S. Pat. Nos. 4,582,816, 3,405,109, 3,324,093, EP-A-479186 and U.S. Pat. No. 5,391,654.

To adjust the $MFR_2$ of the polyethylene hydrogen may be fed into the reactor. The molar ratio of hydrogen to ethylene may be 300 to 450 mol/kmol, preferably 320 to 430 mol/kmol, more preferably 350 to 410 mol/kmol. The temperature in the slurry phase polymerization may be from 50 to 115° C., preferably from 60 to 110° C., more preferably from 70 to 100° C. The pressure may be from 10 to 150 bar, preferably from 30 to 110 bar, more preferably from 50 to 100 bar.

The slurry can be withdrawn from the slurry phase reactor either continuously or intermittently. A preferred way of intermittent withdrawal is the use of settling legs where the slurry is allowed to concentrate before withdrawing a batch of the concentrated slurry from the reactor. The use of settling legs is disclosed, amongst others, in U.S. Pat. Nos. 3,374,211, 3,242,150 and EP-A-1310295. Continuous withdrawal is disclosed e.g. in EP-A-891990, EP-A-1415999, EP-A-1591460 and WO-A-2007/025640. Continuous withdrawal may be combined with a suitable concentration method as disclosed in EP-A-1415999 and EP-A-1591460.

Settling legs are used to concentrate the slurry that is withdrawn from the reactor. The withdrawn stream thus contains more polymer per volume than the slurry within the reactor in average. This has the benefit that less liquid needs to be recycled back to the reactor and thereby the costs of the equipment are lower. In commercial scale plants the fluid which is withdrawn with the polymer evaporates in a flash tank and from there it is compressed with a compressor and recycled into a slurry phase reactor.

However, the settling legs withdraw the polymer intermittently. This causes the pressure and other variables in the reactor to fluctuate with the period of withdrawal. Also the withdrawal capacity is limited and depends on the size and number of settling legs. To overcome these disadvantages continuous withdrawal is often preferred.

The continuous withdrawal, on the other hand, has the problem that it typically withdraws the polymer in the same concentration as it is present within the reactor. To reduce the amount of hydrocarbons to be compressed the continuous outlet is advantageously combined with a suitable concentration device, such as hydrocyclone or sieve, as disclosed in EP-A-1415999 and EP-A-1591460. The polymer-rich stream is then directed to a flash and the polymer stream is returned directly into the reactor.

From the slurry phase reactor the polymer fraction A1 may be transferred to a gas phase reactor. In a fluidised bed gas phase reactor an olefin is polymerised in the presence of Ziegler-Natta catalyst in an upwards moving gas stream. A fluidised bed may comprise the growing polymer particles including the active catalyst located above a fluidisation grid.

The polymer bed is fluidised with the help of a fluidisation gas comprising the olefin monomer, eventual comonomer(s), eventual chain growth controllers or chain transfer agents, such as hydrogen, and eventual inert gas used in the slurry phase reactor or inert gas can be different. The fluidisation gas is introduced into an inlet chamber at the bottom of the reactor. To make sure that the gas flow is uniformly distributed over the cross-sectional surface area of the inlet chamber the inlet pipe may be equipped with a flow dividing element as known in the art, e.g. U.S. Pat. No. 4,933,149 and EP-A-684871.

From the inlet chamber the gas flow is passed upwards through a fluidisation grid into the fluidised bed. The purpose of the fluidisation grid is to divide the gas flow evenly through the cross-sectional area of the bed. Sometimes the fluidisation grid may be arranged to establish a gas stream to sweep along the reactor walls, as disclosed in WO-A-2005/087361. Other types of fluidisation grids are disclosed, among others, in U.S. Pat. No. 4,578,879, E-A-600414 and EP-A-721798. An overview is given in Geldart and Bayens: The Design of Distributors for Gas-fluidized Beds, Powder Technology, Vol. 42, 1985.

The fluidisation gas passes through the fluidised bed. The superficial velocity of the fluidisation gas must be higher than minimum fluidisation velocity of the particles contained in the fluidised bed, as otherwise no fluidisation would occur. On the other hand, the velocity of the gas should be lower than the onset velocity of pneumatic transport, as otherwise the whole bed would be entrained with the fluidisation gas. The minimum fluidisation velocity and the onset velocity of pneumatic transport can be calculated when the particle characteristics are known by using common engineering practise. An overview is given, among others in Geldart: Gas Fluidization Technology, J. Wiley & Sons, 1986.

When the fluidisation gas is contacted with the bed containing the active catalyst the reactive components of the gas, such as monomers and chain transfer agents, react in the presence of the catalyst to produce the polymer product. At the same time the gas is heated by the reaction heat.

The unreacted fluidisation gas is removed from the top of the reactor, compressed and recycled into the inlet chamber of the reactor. Prior to the entry into the reactor fresh reactants are introduced into the fluidisation gas stream to compensate for the losses caused by the reaction and product withdrawal. It is generally known to analyse the composition of the fluidisation gas and introduce the gas components to keep the composition constant. The actual composition is determined by the desired properties of the product and the catalyst used in the polymerisation.

After that the gas is cooled in a heat exchanger to remove the reaction heat. The gas is cooled to a temperature which is lower than that of the bed to prevent the bed from heating because of the reaction. It is possible to cool the gas to a temperature where a part of it condenses. When the liquid droplets enter the reaction zone they are vaporised. The vaporisation heat then contributes to the removal of the reaction heat. This kind of operation is called condensed mode and variations of it are disclosed, among others, in WO-A-2007/025640, U.S. Pat. No. 4,543,399, EP-A-699213 and WO-A-94/25495. It is also possible to add condensing agents into the recycle gas stream, as disclosed in EP-A-696293. The condensing agents are non-polymerisable components, such as n-pentane, isopentane, n-butane or isobutene, which are at least partially condensed in the cooler.

The catalyst may be introduced into the reactor in various ways, either continuously or intermittently. Among others, WO-A-01/05845 and EP-A-499759 disclose such methods. Where the gas phase reactor is a part of a reactor cascade the catalyst is usually dispersed within the polymer particles from the preceding polymerisation stage. The polymer particles may be introduced into the gas phase reactor as disclosed in EP-A-1415999 and WO-A-00/26258.

The polymeric product may be withdrawn from the gas phase reactor either continuously or intermittently. Combinations of these methods may also be used. Continuous withdrawal is disclosed, among others, in WO-A-00/29452. Intermittent withdrawal is disclosed, among others, in U.S. Pat. No. 4,621,952, EP-A-188125, EP-A-250169 and EP-A-579426.

The top part of the gas phase reactor may include a so called disengagement zone. In such a zone the diameter of the reactor is increased to reduce the gas velocity and allow the particles that are carried from the bed with the fluidisation gas to settle back to the bed.

The bed level may be observed by different techniques known in the art. For instance, the pressure difference between the bottom of the reactor and a specific height of the bed may be recorded over the whole length of the reactor and the bed level may be calculated based on the pressure difference values. Such a calculation yields a time-averaged level. It is also possible to use ultrasonic sensors or radioactive sensors. With these methods instantaneous levels may be obtained, which of course may then be averaged over time to obtain time-averaged bed level.

Also antistatic agent(s) may be introduced into the gas phase reactor if needed. Suitable antistatic agents and methods to use them are disclosed, among others, in U.S. Pat. Nos. 5,026,795, 4,803,251, 4,532,311, 4,855,370 and EP-A-560035. They are usually polar compounds and include, among others, water, ketones, aldehydes and alcohols.

The reactor may also include a mechanical agitator to further facilitate mixing within the fluidised bed. An example of suitable agitator design is given in EP-A-707513.

To control the molecular weight ethylene polymer in gas phase polymerisation stage then hydrogen may be added to the gas phase reactor so that the molar ratio of hydrogen to ethylene is from 10.0 to 30.0 mol/kmol, preferably from 15.0 to 25.0 mol/kmol. Comonomer, which is in this embodiment 1-hexene, may then be introduced into the gas phase polymerisation stage so that the molar ratio of comonomer to ethylene is from 60 to 95 mol/kmol, and preferably from 70 to 90 mol/kmol.

Extrusion

When the polymer mixture has been removed from the polymerisation reactor it is subjected to process steps for removing residual hydrocarbons from the polymer. Such processes are well known in the art and can include pressure reduction steps, purging steps, stripping steps, extraction steps and so on. Also combinations of different steps are possible.

According to one preferred process a part of the hydrocarbons is removed from the polymer powder by reducing the pressure. The powder is then contacted with steam at a temperature of from 90 to 110° C. for a period of from 10 minutes to 3 hours. Thereafter the powder is purged with inert gas, such as nitrogen, over a period of from 1 to 60 minutes at a temperature of from 20 to 80° C.

According to another preferred process the polymer powder is subjected to a pressure reduction as described above. Thereafter it is purged with an inert gas, such as nitrogen, over a period of from 20 minutes to 5 hours at a temperature of from 50 to 90° C. The inert gas may contain from 0.0001 to 5%, preferably from 0.001 to 1%, by weight of components for deactivating the catalyst contained in the polymer, such as steam.

The purging steps are preferably conducted continuously in a settled moving bed. The polymer moves downwards as a plug flow and the purge gas, which is introduced to the bottom of the bed, flows upwards.

Suitable processes for removing hydrocarbons from polymer are disclosed in WO-A-02/088194, EP-A-683176, EP-A-372239, EP-A-47077 and GB-A-1272778.

After the removal of residual hydrocarbons the polymer is preferably mixed with additives as it is well known in the art. Such additives include antioxidants, process stabilisers, neutralisers, lubricating agents, nucleating agents, pigments and so on. Carbon black may be mentioned as a typical pigment. The polyethylene composition may comprise all these additives. Preferably the amount of these additives is 10 wt % or below, more preferably 8 wt % or below, most preferably 5 wt % or below of the polyethylene composition. The amount of carbon black may be 8 wt % or below, more preferably 1 to 4 wt % of the total composition. The amount of other additives different from carbon black may be 1 wt % or less, more preferably 0.5 wt % or less. The amount of base resin in the polyethylene composition may vary from 85 to 100 wt %, preferably from 90 to 100 wt %, more preferably from 95 to 100 wt %.

The polymer particles are mixed with additives and extruded to pellets as it is known in the art. Preferably a counter-rotating twin screw extruder is used for the extrusion step. Such extruders are manufactured, for instance, by Kobe and Japan Steel Works. A suitable example of such extruders is disclosed in EP-A-1600276. Typically the specific energy input (SEI) is during the extrusion within the range of from 180 to 250 kWh/ton. The melt temperature is typically from 220 to 290° C.

Methods

Melt Index

The melt flow rate (MFR) is determined according to ISO 1133 and is indicated in g/10 min. The MFR is an indication of the melt viscosity of the polymer. The MFR is determined at 190° C. for PE. The load under which the melt flow rate is determined is usually indicated as a subscript, for instance $MFR_2$ is measured under 2.16 kg load (condition D), $MFR_5$ is measured under 5 kg load (condition T) or $MFR_{21}$, is measured under 21.6 kg load (condition G).

The quantity FRR (flow rate ratio) is an indication of molecular weight distribution and denotes the ratio of flow rates at different loads. Thus, $FRR_{21/5}$ denotes the value of $MFR_{21}/MFR5$.

Density

Density of the polymer was measured according to ISO 1183/1872-2B.

For the purpose of this invention the density of the blend can be calculated from the densities of the components according to:

$$\rho_b = \sum_i w_i \cdot \rho_i$$

where $\rho_b$ is the density of the blend,
$w_i$ is the weight fraction of component "i" in the blend and
$\rho_i$ is the density of the component "i".

Comonomer Content

Quantitative nuclear-magnetic resonance (NMR) spectroscopy was used to quantify the comonomer content of the polymers.

Quantitative $^{13}C\{^1H\}$ NMR spectra recorded in the molten-state using a Bruker Advance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification.{klimke06, parkinson07, castignolles09} Standard single-pulse excitation was employed utilising the transient NOE at short recycle delays of 3 s {pollard04, klimke06} and the RS-HEPT decoupling scheme{fillip05,griffin07}.

A total of 1024 (1 k) transients were acquired per spectrum. This setup was chosen for high sensitivity towards low comonomer contents.

Quantitative $^{13}C\{^1H\}$ NMR spectra were processed, integrated and quantitative properties determined using custom spectral analysis automation programs. All chemical shifts are internally referenced to the bulk methylene signal (δ+) at 30.00 ppm {randall89}.

Characteristic signals corresponding to the incorporation of 1-hexene were observed (randall89) and all contents calculated with respect to all other monomers present in the polymer.

Characteristic signals resulting from isolated 1-hexene incorporation i.e. EEHEE comonomer sequences, were observed. Isolated 1-hexene incorporation was quantified using the integral of the signal at 38.29 ppm assigned to the *B4 sites, accounting for the number of reporting sites per comonomer:

$$H = I_{*B4}$$

With no other signals indicative of other comonomer sequences, i.e. consecutive comonomer incorporation, observed the total 1-hexene comonomer content was calculated based solely on the amount of isolated 1-hexene sequences:

$$H_{total} = H$$

Characteristic signals resulting from saturated end-groups were observed. The content of such saturated end-groups was quantified using the average of the integral of the signals at 22.84 and 32.23 ppm assigned to the 2s and 2s sites respectively:

$$S = (\tfrac{1}{2})*(I_{2S} + I_{3S})$$

The relative content of ethylene was quantified using the integral of the bulk methylene (δ+) signals at 30.00 ppm:

$$E = (\tfrac{1}{2})*I_{\delta+}$$

The total ethylene comonomer content was calculated based the bulk methylene signals and accounting for ethylene units present in other observed comonomer sequences or end-groups:

$$E_{total} = E + (5/2)*H + (3/2)*S$$

The total mole fraction of 1-hexene in the polymer was then calculated as:

$$fH = (H_{total})/(E_{total} + H_{total})$$

The total comonomer incorporation of 1-hexene in mole percent was calculated from the mole fraction in the usual manner:

$$H[\text{mol \%}] = 100*fH$$

The total comonomer incorporation of 1-hexene in weight percent was calculated from the mole fraction in the standard manner:

$$H[\text{wt \%}] = 100*(fH*84.16)/((fH*84.16)+((1-fH)*28.05))$$

klimke06
 Klimke, K., Parkinson, M., Piel, C., Kaminsky, W., Spiess, H. W., Wilhelm, M., Macromol. Chem. Phys. 2006; 207:382.
parkinson07
 Parkinson, M., Klimke, K., Spiess, H. W., Wilhelm, M., Macromol. Chem. Phys. 2007; 208:2128.
pollard04
 Pollard, M., Klimke, K., Graf, R., Spiess, H. W., Wilhelm, M., Sperber, O., Piel, C., Kaminsky, W., Macromolecules 2004; 37:813.
filip05
 Filip, X., Tripon, C., Filip, C., J. Mag. Resn. 2005, 176, 239
griffin07
 Griffin, J. M., Tripon, C., Samoson, A., Filip, C., and Brown, S. P., Mag. Res. in Chem. 2007 45, S1, S198
castignolles09
 Castignolles, P., Graf, R., Parkinson, M., Wilhelm, M., Gaborieau, M., Polymer 50 (2009) 2373
randall89
 J. Randall, Macromol. Sci., Rev. Macromol. Chem. Phys. 1989, C29, 201.

Molecular Weight Averages, Molecular Weight Distribution ($M_n$, $M_w$, $M_z$, MWD)

Molecular weight averages ($M_z$, $M_w$ and $M_n$), Molecular weight distribution (MWD) and its broadness, described by polydispersity index, PDI=$M_w/M_n$ (wherein $M_n$ is the number average molecular weight and $M_w$ is the weight average molecular weight) were determined by Gel Permeation Chromatography (GPC) according to ISO 16014-1:2003, ISO 16014-2:2003, ISO 16014-4:2003 and ASTM D 6474-12 using the following formulas:

$$M_n = \frac{\sum_{i=1}^{N} A_i}{\sum_{i=1}^{N}(A_i/M_i)} \quad (1)$$

$$M_w = \frac{\sum_{i=1}^{N}(A_i \times M_i)}{\sum_{i=1}^{N} A_i} \quad (2)$$

$$M_z = \frac{\sum_{i=1}^{N}(A_i \times M_i^2)}{\sum_{i=1}^{N}(A_i \times M_i)} \quad (3)$$

For a constant elution volume interval $\Delta V_i$, where $A_i$, and $M_i$ are the chromatographic peak slice area and polyolefin molecular weight (MW), respectively associated with the elution volume, $V_i$, where N is equal to the number of data points obtained from the chromatogram between the integration limits.

A high temperature GPC instrument, equipped with either infrared (IR) detector (IR4 or IR5 from PolymerChar (Valencia, Spain) or differential refractometer (RI) from Agilent Technologies, equipped with 3× Agilent-PLgel Olexis and 1× Agilent-PLgel Olexis Guard columns was used. As the solvent and mobile phase 1,2,4-trichlorobenzene (TCB) stabilized with 250 mg/L 2,6-Di tert butyl-4-methyl-phenol) was used. The chromatographic system was operated at 160° C. and at a constant flow rate of 1 mL/min. 200 µL of sample solution was injected per analysis. Data collection was performed using either Agilent Cirrus software version 3.3 or PolymerChar GPC-IR control software.

The column set was calibrated using universal calibration (according to ISO 16014-2:2003) with 19 narrow MWD polystyrene (PS) standards in the range of 0.5 kg/mol to 11 500 kg/mol. The PS standards were dissolved at room temperature over several hours. The conversion of the polystyrene peak molecular weight to polyolefin molecular weights is accomplished by using the Mark Houwink equation and the following Mark Houwink constants:

$$K_{PS}=19\times10^{-3} \text{ mL/g}, \alpha_{PS}=0.655$$

$$K_{PE}=39\times10^{-3} \text{ mL/g}, \alpha_{PE}=0.725$$

$$K_{PP}=19\times10^{-3} \text{ mL/g}, \alpha_{PP}=0.725$$

A third order polynomial fit was used to fit the calibration data.

All samples were prepared in the concentration range of 0.5-1 mg/ml and dissolved at 160° C. for 2.5 hours for PP or 3 hours for PE under continuous gentle shaking.

Pressure Test on Un-Notched Pipes

The resistance to internal pressure has been determined in a pressure test on pressure test on un-notched 32 mm SDR 11 pipes having a length of 450 mm is carried out in water-inside and water-outside environment according to ISO 1167-1:2006. End caps of type A were used. The time to failure is determined in hours. The following conditions were applied: hoop stress of 12.4 MPa at temperature of 20° C., hoop stress of 12.0 MPa at temperature of 20° C., hoop stress of 11.6 MPa at temperature of 20° C., hoop stress of 5.6 MPa at temperature of 80° C., hoop stress of 5.4 MPa at temperature of 80° C. and hoop stress of 4.6 MPa at temperature of 80° C.

Tensile Modulus

As a measure for stiffness, the tensile modulus (E-modulus) of the compositions was measured at 23° C. on compression molded specimens according to ISO 527-2:1993. The specimens (1A type) were cut from plaques of 4 mm thickness prepared by compression molding according to ISO 293:2004 using the conditions defined in chapter 3.3 of ISO 1872-2:2007. The modulus was measured at a speed of 1 mm/min.

Tensile Properties

Strain at break, yield strain, stress at break and yield stress are measured according to ISO 527-1 (cross head speed 50 mm/min) at a temperature of 23° C.

Strain Hardening Modulus

Strain hardening modulus of the compounds was obtained from a tensile stress-strain curve above the natural draw ratio and represents the slope of the increase in the stress-strain trend at very high strains (the strain hardening regime). It was measured at 80° C. and 20 mm/min on preconditioned (120° C./1 h) 300 µm thick specimens according to ISO 18488.

White Spot Rating

A sample of the composition (including a pigment to make the inhomogeneities visible, i.e. carbon black) is obtained after the compounding step. Microtome cuts with a thickness of about 10 µm were made from 6 pellets of the respective sample perpendicular to extrusion direction. The microtome cuts were characterized by light microscopy (ZEISS microscope Axioimager) to get white spot rating according to ISO 18553.

Rheology

The characterization of polymer melts by dynamic shear measurements complies with ISO standards 6721-1 and 6721-10. The measurements were performed on an Anton Paar MCR501 stress controlled rotational rheometer, equipped with a 25 mm parallel plate geometry. Measurements were undertaken on compression molded plates, using nitrogen atmosphere and setting a strain within the linear viscoelastic regime. The oscillatory shear tests were done at a temperature of 190° C. applying a frequency range between 0.01 and 628 rad/s and setting a gap of 1.3 mm.

In a dynamic shear experiment the probe is subjected to a homogeneous deformation at a sinusoidal varying shear strain or shear stress (strain and stress controlled mode, respectively). On a controlled strain experiment, the probe is subjected to a sinusoidal strain that can be expressed by $$\gamma(t)=\gamma_0 \sin(\omega t) \quad (1)$$

If the applied strain is within the linear viscoelastic regime, the resulting sinusoidal stress response can be given by $$\sigma(t)=\sigma_0 \sin(\omega t+\delta) \quad (2)$$

Where $\sigma_0$ and $\gamma_0$ are the stress and strain amplitudes, respectively,
$\omega$ is the angular frequency,
$\delta$ is the phase shift (loss angle between applied strain and stress response),
t is the time.

Dynamic test results are typically expressed by means of several different rheological functions, namely the shear storage modulus G', the shear loss modulus, G", the complex shear modulus, G*, the complex shear viscosity, η*, the dynamic shear viscosity, η', the out-of-phase component of the complex shear viscosity η' and the loss tangent, tan δ which can be expressed as follows:

$$G' = \frac{\sigma_0}{\gamma_0}\cos\delta \text{ [Pa]} \quad (3)$$

$$G' = \frac{\sigma_0}{\gamma_0}\sin\delta \text{ [Pa]} \quad (4)$$

$$G^* = G' + iG'' \text{ [Pa]} \quad (5)$$

$$\eta^* = \eta' - i\eta'' \text{ [Pa}\cdot s] \quad (6)$$

$$\eta' = \frac{G''}{\omega} \text{ [Pa}\cdot s] \quad (7)$$

$$\eta'' = \frac{G'}{\omega} \text{ [Pa}\cdot s] \quad (8)$$

The values of storage modulus (G'), loss modulus (G"), complex modulus (G*) and complex viscosity (η*) were obtained as a function of frequency (ω). Thereby, e.g. $\eta^*_{0.05\ rad/s}$ (eta*$_{0.05\ rad/s}$) is used as abbreviation for the complex viscosity at the frequency of 0.05 rad/s or $\eta^*_{300\ rad/s}$ (eta*$_{300\ rad/s}$) is used as abbreviation for the complex viscosity at the frequency of 300 rad/s.

Shear thinning index (SHI), which correlates with MWD and is independent of $M_w$, was obtained by calculating the complex viscosities at given values of complex modulus and calculating the ratio of the two viscosities. For example, using the values of complex modulus of 2.7 kPa and 210 kPa, then η*(2.7 kPa) and η*(210 kPa) are obtained at a constant value of complex modulus of 2.7 kPa and 210 kPa, respectively. The shear thinning index $SHI_{2.7/210}$ is then defined as the ratio of the two viscosities η*(2.7 kPa) and η*(210 kPa), i.e. η(2.7)/η(210). In case that viscosity data are not available at the given complex modulus of 2.7 kPa or 210 kPa, single point interpolation with an activated extrapolation option was done with the software Rheoplus from Anton Paar Germany GmbH.

PI

The polydispersity index, PI, is defined by equation:

$$PI = \frac{10^5}{G'(\omega_{COP})}, \omega_{COP} = \omega \text{ for } (G' = G'')$$

where, $\omega_{COP}$ is the cross-over angular frequency, determined as the angular frequency for which the storage modulus, G' equals the loss modulus, G".

Eta 747:

One method which correlates well with the sagging properties, and is used in connection with the present invention relates to the rheology of the polymer and is based on determination of the viscosity of the polymer at a very low, constant shear stress. A shear stress of 747 Pa has been selected for this method. The viscosity of the polymer at this shear stress is determined at a temperature of 190° C. and has been found to be inversely proportional to the gravity flow of the polymer, i.e. the greater the viscosity the lower the gravity flow.

The determination of the viscosity at 747 Pa shear stress is made by using a rotational rheometer, which can be a constant stress rheometer as for example an Anton Paar MCR Series Rheometer. Rheometers and their function have been described in "Encyclopedia of Polymer Science and Engineering", 2nd Ed., Vol. 14, pp. 492-509. The measurements are performed under a constant shear stress between two 25 mm diameter plates (constant rotation direction). The gap between the plates is 1.2 mm. A 1.2 mm thick polymer sample is inserted between the plates.

The sample is temperature conditioned during 2 min before the measurement is started. The measurement is performed at 190° C. After temperature conditioning the measurement starts by applying the predetermined stress. The stress is maintained during 1800 s to let the system approach steady state conditions. After this time the measurement starts and the viscosity is calculated.

The measurement principle is to apply a certain torque to the plate axis via a precision motor. This torque is then translated into a shear stress in the sample. This shear stress is kept constant. The rotational speed produced by the shear stress is recorded and used for the calculation of the viscosity of the sample.

EXAMPLES

Catalyst Preparation

A. Preparation of Pre-Treated Support Material:

A jacketed 160 dm³ stainless steel reactor equipped with a helical mixing element was pressurized with N₂ to 2.0 barg and depressurized down to 0.2 barg until the O₂ level was less than 3 ppm. The vessel was then charged with heptane (20.5 kg) and 2,2-di(tetrahydrofuryl)propane (0.520 kg; 2.81 mol; DTHFP). The obtained mixture was stirred for 20 min at 40 rpm. The MgCl₂*3EtOH carrier (6.6 kg; DTHFP/Mg=0.1 mol/mol; 27.5 mol of Mg; Mg 10.18 wt-%, d10=9.5 μm, d50=17.3 μm and d90=28.5 μm, granular shaped) was added to the reactor with stirring. This suspension was cooled to approximately −20° C. and the 33 wt % solution of triethylaluminum (29.8 kg, 84.3 mol of Al; Al/EtOH=1.0 mol/mol) in heptane was added in aliquots during 3 h 20 min time while keeping the temperature below 10° C. After the TEA addition, the reaction mixture was gradually heated to 80° C. over a period of 2 h 40 min and kept at this temperature for additional 20 min at 40 rpm. The suspension was allowed to settle for 10 min, and the mother liquor was removed through a 10 μm filter net in the bottom of the reactor during 30 min. The vessel was charged with warm toluene (43 kg) and then stirred at 40 rpm for 20 min at 36-61° C. The suspension was allowed to settle for 10 min at 50-55° C. and the liquid removed through a 10 μm filter net in the bottom of the reactor during 15 min.

B. Catalyst Preparation:

The vessel containing the pre-treated support material was charged with toluene (43 kg) and then cooled to approximately 30° C. Neat TiCl₄ (5.25 kg, 27.5 mol; Ti/Mg=1.0 mol/mol) was added. The obtained suspension was heated to approximately 90° C. over a period of 2 h 15 min and kept at this temperature for additional 1 h with stirring at 40 rpm. The suspension was allowed to settle for 10 min at approximately 90° C. and the mother liquor was removed through a 10 μm filter net in the bottom of the reactor during 15 min. The obtained solid material was washed twice with toluene (43 kg each) at ≈90° C. and once with heptane (34 kg) at ~40° C. All three of these washing steps used the same sequence of events: addition of preheated (90 or 40° C.) solvent, then stirring at 40 rpm for 30 min, allowing the solid to settle for 10 min, and then removal of liquid through a 10 μm filter net in the bottom of the reactor during 15 min.

The obtained catalyst was mixed with 20 kg of white oil and dried 4 h at 40-50° C. with nitrogen flow (2 kg/h) and vacuum (−1 barg). The catalyst was taken out from the reactor and reactor was flushed with another 20 kg of oil and taken out to the same drum. The dry catalyst yield was 3.76 kg (93.7% based on Mg).

Inventive Examples (IE2, IE3)

A loop reactor having a volume of 50 dm³ was operated at a temperature of 60° C. and a pressure of 58 bar. Into the reactor were fed ethylene, 1-butene, propane diluent and hydrogen so that the feed rate of ethylene was 4.0 kg/h, 1-butene was 150 g/h, hydrogen was 10 g/h and propane was 50 kg/h. Also 5 g/h of a solid polymerization catalyst component produced as described above in Catalyst Preparation was introduced into the reactor together with triethylaluminium cocatalyst so that the molar ratio of Al/Ti was about 8 mol/mol. The estimated production rate was 3.8 kg/h. The C2 feed, the H2 feed, the C4 feed and the production split are listed for the prepolymer in Table 1.

A stream of slurry from the reactor was continuously withdrawn and directed into a loop reactor having a volume of 350 dm³ and which was operated at 95° C. temperature and 56 bar pressure. Into the reactor was further added a fresh propane feed of 118 kg/h and ethylene, and hydrogen so that the ethylene content in the fluid reaction mixture was 4.6 mol-% and the molar ratio of hydrogen to ethylene varied from 364 to 385 mol/kmol. More TEA was fed into the loop reactor so that the final molar ratio of Al/Ti was about 15 mol/mol. The ethylene copolymer withdrawn from the reactor had MFR₂ of from 75 to 103 g/10 min and density of 968 kg/m³. The production rate was 30 kg/h. The H2/C2 ratio, the C4/C2 ratio, the production split, the density and the MFR$_2$ of the polymer fraction A1 produced in this loop reactor are listed in Table 1.

The slurry was withdrawn from the loop reactor intermittently and directed to a flash vessel operated at a temperature of 50° C. and a pressure of 3 bar. From there the polymer was directed to a fluidized bed gas phase reactor operated at a pressure of 20 bar and a temperature of 85° C. Additional ethylene, 1-hexene comonomer, nitrogen as inert gas and hydrogen were added so that the ethylene content in the fluid reaction mixture was 4.7 mol-%, the ratio of hydrogen to ethylene was from 20 to 21 mol/kmol and the molar ratio of 1-hexene to ethylene was from 59 to 81 mol/kmol. The polymer production rate in the gas phase reactor was 34 kg/h and thus the total polymer withdrawal rate from the gas phase reactor was about 68 kg/h. The polymer had a melt flow rate MFR$_5$ of 0.12 to 0.14 g/10 min and a density of 940 to 943 kg/m$^3$. The production split (weight-% prepolymer/weight-% 1$^{st}$ stage component (fraction A1)/weight-% 2nd stage component (fraction A2) was 5-6/45-49/45-51 depending on the inventive example. The H2/C$_2$ ratio, the C$_6$/C$_2$ ratio, the production split, the density, the MFR$_5$ and the MFR$_{21}$, of the polymer fraction A2 produced in this gas phase reactor are listed in Table 1. Also the density and the MFR5 of the mixed polymer are listed in Table 1.

The polymer powder was mixed under nitrogen atmosphere with 0.15% of Ca-stearate, 0.22% of Irganox B225 and 5.75% of HE0880-A, i.e., a carbon black masterbatch that contains 39.5% CB. Then it was compounded and extruded under nitrogen atmosphere to pellets by using a JSW CIMP90 extruder so that the SEI was 230 kWh/ton and the melt temperature 240-250° C. The density, the MFR$_5$ and the MFR$_{21}$, of pellets are listed in Table 1.

TABLE 1

|  | IE2 | IE3 |
| --- | --- | --- |
| Prepolymerizer: | | |
| Catalyst: Al/Ti [mol/mol] | 8 | 8 |
| C2 feed (kg/h) | 4 | 4 |
| H2 feed (g/h) | 10 | 10 |
| C4 feed (g/h) | 150 | 150 |
| Split (wt %) | 6 | 5 |
| Loop: | | |
| Catalyst: Al/Ti [mol/mol] | 16 | 16 |
| H2/C2 (mol/kmol) | 366 | 364 |
| C4/C2 (mol/kmol) | 14 | 13 |
| Split (wt %) | 49 | 44 |
| Density (kg/m$^3$)$^{1)}$ | 968 | 968 |
| MFR$_2$ (g/10 min)$^{1)}$ | 96 | 75 |
| Gas phase: | | |
| H2/C2 (mol/kmol) | 20 | 21 |
| C6/C2 (mol/kmol) | 64 | 59 |
| Split (wt %) | 45 | 51 |
| Density (kg/m$^3$)$^{1)}$ | 940 | 943 |
| MFR$_5$ (g/10 min)$^1$ | 0.12 | 0.12 |
| MFR$_{21}$ (g/10 min)$^{1)}$ | 3 | 4.1 |
| PE Mixer: | | |
| Density (kg/m$^3$) | 943 | 943 |
| MFR$_5$ (g/10 min) | 0.13 | 0.10 |

TABLE 1-continued

|  | IE2 | IE3 |
| --- | --- | --- |
| PE Pellet: | | |
| MFR$_5$ (g/10 min) | 0.13 | 0.16 |
| MFR$_{21}$ (g/10 min) | 4.5 | 4.7 |
| Density (kg/m$^3$) | 956 | 956 |

From spot samples, measured every 4 hours during production

Comparative Examples

Comparative examples CE1 and CE2 are commercially available. Pipes made from CE1 material meets the PE80 requirements and pipes made from CE2 material meets the PE100 requirements. The properties of the CE1 and CE2 materials together with the inventive examples IE2 and IE3 material are shown in Table 2.

Pipe Preparation

The compounded materials of Inventive Examples IE2 and IE3 and Comparative Examples CE1 and CE2 were extruded into pipes having an external diameter of about 32 mm and a thickness of 3 mm respectively. The pressure test results of pipes are given in Table 2.

TABLE 2

|  | IE2 | IE3 | CE1 | CE2 |
| --- | --- | --- | --- | --- |
| HMW Split % | 45 | 51 | 54 | 50 |
| Density (kg/m$^3$) | 943 | 943 | 943 | 948 |
| MFR$_5$ (g/10 min) | 0.12 | 0.12 | 0.78 | 0.23 |
| MFR$_{21}$ (g/10 min) | 3 | 4.1 | 16.5 | 10 |
| Pellet Density (kg/m$^3$) | 956 | 956 | 952 | 959 |
| C6 (mol %) | 0.72 | 0.64 |  | 0.52 |
| Strain at break (%) | 591 | 708 |  | 595 |
| Tensile Modulus (MPa) | 905 | 922 | 800 | 1058 |
| Yield Strain (%) | 10.6 | 10.6 |  | 9 |
| Stress at Break (MPa) | 30.9 | 22.0 |  | 28.2 |
| Yield Stress (MPa) | 21.6 | 22.0 |  | 24.9 |
| Strain Hardening Modulus (MPa) |  |  |  | 74.2 |
| Eta747 (kPa · s) | 687 | 525 |  | 624 |
| Eta$_{0.05\ rad/s}$ (Pa · s) | 231888 | 195992 |  | 167600 |
| Eta$_{300\ rad/s}$ (Pa · s) | 1449 | 1431 |  | 1072 |
| PI (Pa$^{-1}$) | 2 | 2 |  | 3.62 |
| M$_n$ (g/mol) | 11450 | 11600 |  | 7960 |
| M$_w$ (g/mol) | 262500 | 242500 |  | 233500 |
| MWD | 23 | 21 |  | 29 |
| White Spot Rating | 6.4 | 5.3 |  | ≤7 |
| FRR$_{21/5}$ | 25 | 34 | 21.2 | 43.5 |
| SHI$_{2.7/210}$ | Pipe pressure testing | | | |
| 12.4 MPa (20° C.) |  |  |  |  |
| 12.4 MPa (20° C.) |  |  |  |  |
| 12.0 MPa (20° C.) | 56.2 | 68.5 |  |  |
| 12.0 MPa (20° C.) | 48.1 | 56.6 |  |  |

TABLE 2-continued

| | IE2 | IE3 | CE1 | CE2 |
|---|---|---|---|---|
| 11.6 MPa (20° C.) | | | 62 | |
| 5.6 MPa (80° C.) | | | | |
| 5.6 MPa (80° C.) | | | | |
| 5.4 MPa (80° C.) | 841 | 4235 | | 2434 |
| 5.4 MPa (80° C.) | 452 | 3051 | | 2988 |
| 4.6 MPa (80° C.) | | | 325 | |
| 4.6 MPa (80° C.) | | | 734 | |

The written description includes examples of the invention to enable persons skilled in the art to produce and exploit the invention. However, the claims define the scope of protection, which may cover also other examples of the invention. Such examples may have elements that belong to the literal language of the claims or they are equivalent including only minor differences from the literal language of the claims.

The invention claimed is:

1. A polyethylene composition comprising a base resin which comprises
   (a) an ethylene homo- or copolymer fraction (A1); and
   (b) an ethylene homo- or copolymer fraction (A2), wherein
   (I) fraction (A1) has a lower weight average molecular weight than fraction (A2);
   (II) the base resin has a density of 930 to 950 kg/m$^3$;
   (III) the base resin has a melt flow rate MFR$_{21}$ of equal to or less than 8.0 g/10 min;
   (IV) the polyethylene composition has a melt flow rate MFR$_5$ of 0.01 to 0.3 g/10 min;
   (V) the polyethylene composition has a flow rate ratio FRR$_{21/5}$ of equal to or more than 25;
   (VI) the ratio of the weight average molecular weight and the number average molecular weight ($M_w/M_n$) of the polyethylene composition is equal to or less than 30; and
   (VII) the polyethylene composition has a tensile modulus of less than 1000 MPa.

2. A polyethylene composition according to claim 1, wherein the ratio of the weight average molecular weight and the number average molecular weight ($M_w/M_n$) of the polyethylene composition is 5 to 30.

3. A polyethylene composition according to claim 1, wherein the polyethylene composition has a tensile modulus of not more than 950 MPa.

4. A polyethylene composition according to claim 1, wherein the polyethylene composition has a tensile modulus of at least 700 MPa.

5. A polyethylene composition according to claim 1, wherein the base resin has a density of 933 to 947 kg/m$^3$.

6. A polyethylene composition according to claim 1, wherein the polyethylene composition has a viscosity at a shear stress of 747 Pa (eta747) of 300 to 700 kPas.

7. A polyethylene composition according to claim 1, wherein a ratio of ETA$_{0.05rad/s}$ to ETA$_{300rad/s}$ of the polyethylene composition is 110 to 180.

8. A polyethylene composition according to claim 1, wherein the polyethylene composition has the melt flow rate MFR$_5$ of 0.05 to 0.3 g/10 min.

9. A polyethylene composition according to claim 1, wherein the base resin has a melt flow rate MFR$_{21}$ of equal to or less than 7.0 g/10 min.

10. A polyethylene composition according to claim 1, wherein the polyethylene composition has a strain hardening modulus of more than 75 MPa.

11. A polyethylene composition according to claim 1, wherein the polyethylene composition has a time to failure of at least 400 h.

12. An article made of polyethylene composition as defined in claim 1.

13. Method for production of an article using a polyethylene composition as defined in claim 1.

14. A process for the production of a polyethylene composition comprising a polyethylene base resin, which comprises steps of
   (a) polymerising ethylene and optionally at least one comonomer in the presence of a polymerisation catalyst to form an ethylene homo- or copolymer fraction (A1); and
   (b) polymerising ethylene and optionally at least one comonomer in the presence of same or different polymerisation catalyst(s) as polymerising the fraction (A1) to form an ethylene homo- or copolymer fraction (A2); and wherein
   (I) fraction (A1) has a lower weight average molecular weight than fraction (A2), and at least one of the catalyst(s) is a Ziegler-Natta (ZN) catalyst;
   (II) the base resin has a density of 930 to 950 kg/m$^3$;
   (III) the base resin has a melt flow rate MFR$_{21}$ of equal to or less than 8.0 g/10 min;
   (IV) the polyethylene composition has a melt flow rate MFR$_5$ of 0.01 to 0.3 g/10 min;
   (V) the polyethylene composition has a flow rate ratio FRR$_{21/5}$ of equal to or more than 20;
   (VI) the ratio of the weight average molecular weight and the number average molecular weight ($M_w/M_n$) of the polyethylene composition is equal to or less than 30; and
   (VII) the polyethylene composition has tensile modulus less than 1000 MPa, wherein the Ziegler-Natta (ZN) catalyst comprises an internal organic compound having the formula (I):

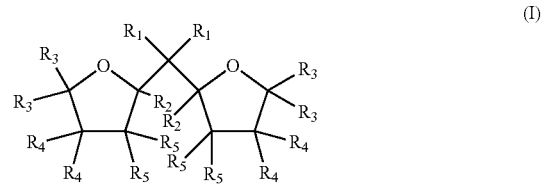

wherein in the formula (I) R$_1$ to R$_5$ are the same or different and can be hydrogen, a linear or branched C1 to C8-alkyl group, or a C3-C8-alkylene group, or two or more of R$_1$ to R$_5$ can form a ring, and the two oxygen-containing rings are individually saturated or partially unsaturated or unsaturated.

15. A process according to claim 14 comprising the additional steps of
   (a) providing solid carrier particles of MgCl$_2$*mROH adduct;
   (b) pre-treating the solid carrier particles of step (a) with a compound of Group 13 metal;

(c) treating the pre-treated solid carried particles of step (b) with a transition metal compound of Group 4 to 6;
(d) recovering the solid catalyst component;
(e) contacting the solid carrier particles with the internal organic compound having the formula (I) prior to the step (c); and
(f) passing the solid catalyst component into the first polymerisation stage, wherein R in the adduct $MgCl_2*mROH$ is a linear or branched alkyl group with 1 to 12 carbon atoms and m is a number from 1 to 6.

* * * * *